J. M. BURTON.
WATER METER.
APPLICATION FILED DEC. 15, 1911.
1,128,657.
Patented Feb. 16, 1915.
2 SHEETS—SHEET 2.
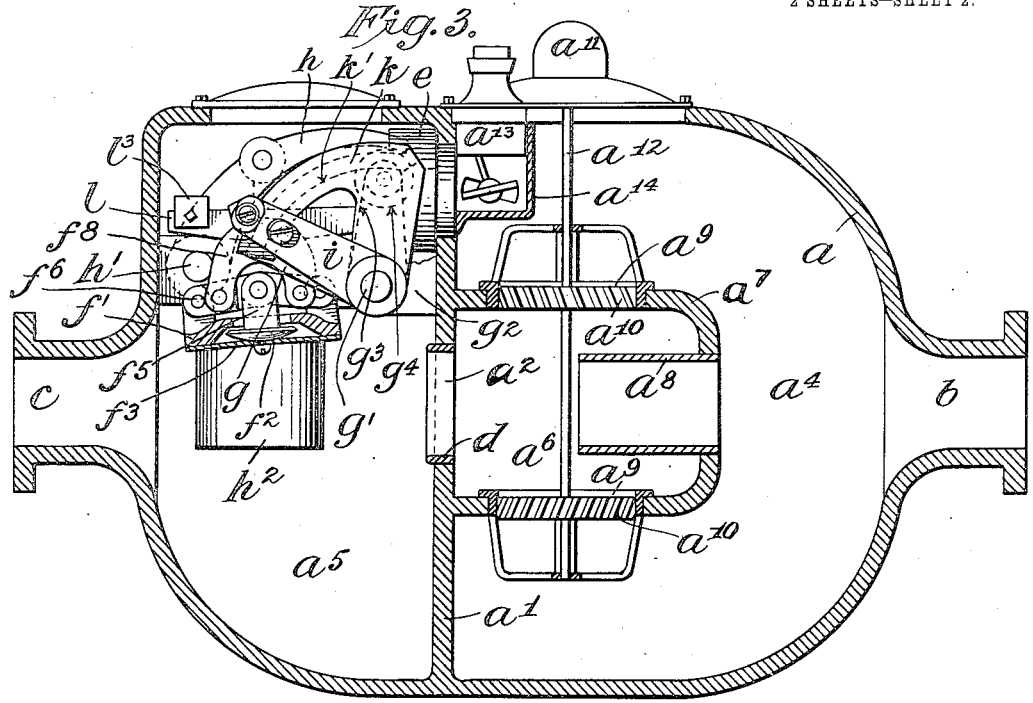
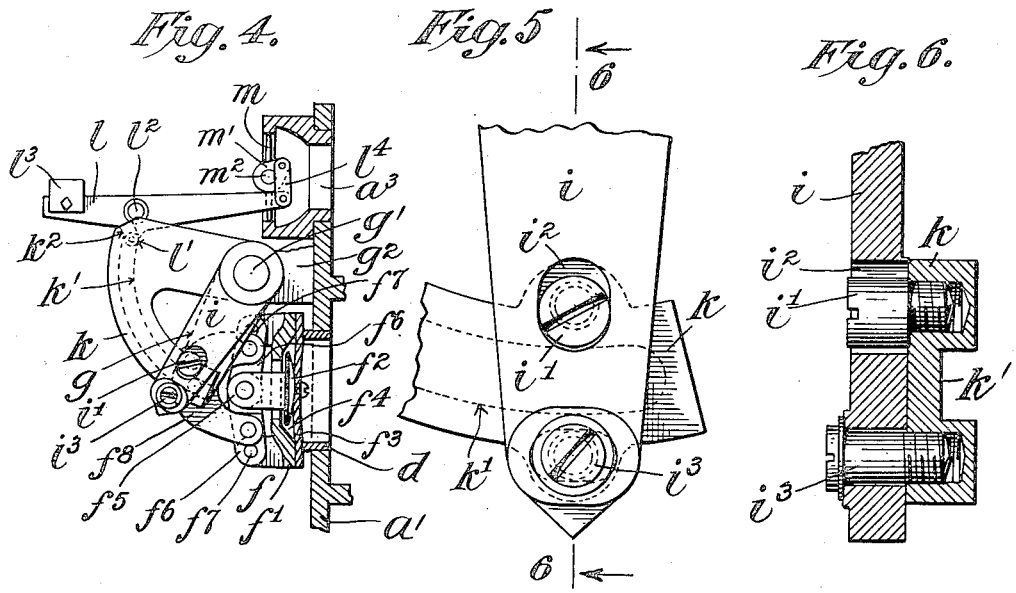
Attest:
Inventor:
by James M. Burton
Redding, Greeley & Austin
Attys.

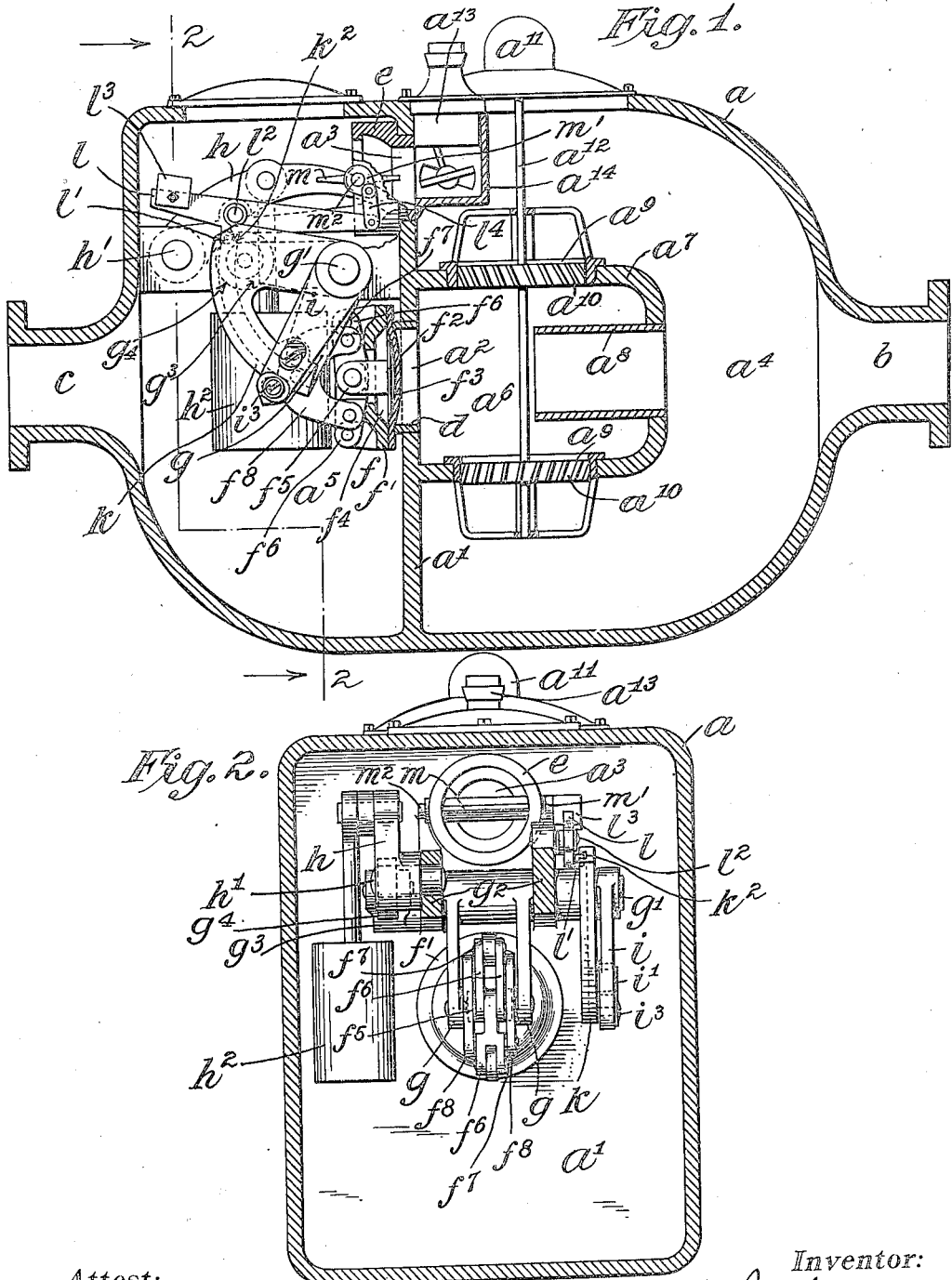

UNITED STATES PATENT OFFICE.

JAMES M. BURTON, OF LONG ISLAND CITY, NEW YORK, ASSIGNOR TO NEPTUNE METER COMPANY, OF NEW YORK, N. Y., A CORPORATION OF NEW JERSEY.

WATER-METER.

1,128,657. Specification of Letters Patent. Patented Feb. 16, 1915.

Application filed December 15, 1911. Serial No. 665,924.

*To all whom it may concern:*

Be it known that I, JAMES M. BURTON, a citizen of the United States, residing in Long Island City, Queens county, State of New York, have invented certain new and useful Improvements in Water-Meters, of which the following is a specification, reference being had to the accompanying drawings, which form a part hereof.

This invention relates to water meters of the general character of that shown and described in Letters Patent of the United States, No. 1,001,578, dated August 22, 1911, in which the ordinary or low-duty flow is metered and in which an extraordinary or high-duty flow is permitted without obstruction or substantial reduction of head. In the meter shown in said Letters Patent there is a straight-flow path through the meter from inlet to outlet which is closed, under low-duty conditions, by a valve which is opened by the pressure whenever the pressure differential at the inlet and the outlet, or on opposite sides of the valve, rises above a predetermined degree. When the valve is closed the entire volume of the water passes through a metering device, but when the valve is open a portion only of the entire volume of water passes through the same metering device which then becomes a proportional metering device. The flow under low-duty conditions and the flow under high-duty conditions are therefore measured by the same metering device and the opening of the valve is made to initiate the operation of a registering device which registers the duration of the flow under high-duty conditions as well as the number of times of operation under high-duty conditions. By the present invention it is sought to retain the advantages of a straight-flow from inlet to outlet under high-duty conditions and to attain a greater accuracy in the measuring of the flow under all conditions, and especially to attain close accuracy of measurement at the time of change from low-duty conditions to high-duty conditions or vice versa.

To this end the improved meter comprises a casing with a high-duty, straight-flow, unobstructed passage from inlet to outlet and a low-duty passage from inlet to outlet, a proportional metering device for high-duty flow at one side of the path of straight-flow, and a separate metering device for low-duty flow. The high-duty passage and the low-duty passage are controlled by valves and means are provided whereby one valve is closed as the other opens, the closure of the low-duty valve taking place, when the change from low-duty conditions to high-duty conditions occurs, before the high-duty valve, actuated by the increase in the pressure differential, has moved sufficiently to permit the escape of water past it. Preferably the opening movement of the high-duty valve is caused, through suitable mechanical connections, to close the low-duty valve, and the invention consists in part in the devices whereby such relative movement of the rotary valve is effected.

The invention will be more fully explained hereinafter with reference to the accompanying drawings in which it is illustrated and in which—

Figure 1 is a view in longitudinal, vertical section of a meter which embodies the invention, the connections whereby the low-duty valve is closed by the opening movement of the high-duty valve being shown in elevation. Fig. 2 is a view in section on the irregular plane indicated by the broken line 2—2 of Fig. 1. Fig. 3 is a view similar to Fig. 1 but showing the high-duty passage open and the valves and their connections in the positions which they assume under such conditions. Fig. 4 is a detail view showing the valves and their connections. Fig. 5 is a detail view illustrating an adjusting device employed in the connections between the valves, the scale being larger than that of the other figures. Fig. 6 is a detail view in section on the plane indicated by the broken line 6—6 of Fig. 5.

The casing $a$, having an inlet $b$ and an outlet $c$ is shown as having a transverse wall $a'$ which is provided with a high-duty orifice $a^2$ in a straight line with the inlet and the outlet and of substantially the same area, and with a low-duty orifice $a^3$ at one side of the straight-flow path, the wall $a'$ forming on one side an inlet chamber $a^4$ and on the other side a discharge chamber $a^5$. An intermediate chamber $a^6$ is formed by a wall $a^7$ which has an inlet nozzle $a^8$ in a line with the inlet $b$ and the outlet $c$, and an orifice or orifices $a^9$ at one side of the path of straight-flow, for the turbine wheel or wheels $a^{10}$ from which the high-duty register, indicated at $a^{11}$, is driven by a shaft $a^{12}$ in the usual manner. The low-duty metering device indicated at $a^{13}$, may also be of any usual or suitable form, being shown as of the displacement or disk type, and as inclosed in a casing $a^{14}$ in front of the orifice $a^3$. It will be observed that the inlet chamber $a^4$ forms a high-duty straight-flow passage from the inlet $b$ to the intermediate chamber $a^6$, a proportional-flow passage from the inlet to the proportional metering device, and a low-duty flow passage from the inlet to the discharge chamber $a^5$ through the wheels of the low-duty metering device $a^{13}$. When the high-duty straight-flow passage is closed by its valve, as hereinafter described, the entire volume of water, under low-duty conditions, that is, under a low pressure differential, passes through the low-duty metering device and is measured thereby. On the other hand, when the high-duty, straight-flow passage is open and the low-duty passage is closed, the inlet chamber $a^4$ is filled completely by the water (the entrapped air being permitted to escape, as usual), and thereafter a certain definite proportion of the entire volume passes through the proportional metering device and actuates the same so that the entire flow under high-duty conditions, that is, under a high pressure differential, is measured proportionally.

In the orifice $a^2$ of the wall $a'$ is preferably secured a sleeve $d$ which forms a seat for the high-duty valve, and in the low-duty orifice $a^3$ is preferably secured a sleeve $e$ which supports the low-duty valve. The high-duty valve $f$ comprises a main part $f'$, a part $f^2$ which is movable relatively to the main part and in the same direction and, preferably, a flexible diaphragm $f^3$ which overlies the main part $f'$ and the relatively movable part $f^2$ and is pressed by the main part $f'$ against the valve seat $d$. In the construction shown, the face of the main part $f'$ is recessed, as at $f^4$, to receive the relatively movable part $f^2$ and the stem $f^5$ of the latter is projected rearwardly through the main part $f'$ and is pivotally and loosely connected to two toggle levers $f^6$ which are pivoted as at $f^7$ on the main part $f'$. A yoke $f^8$ is pivotally connected at its ends to the toggle levers $f^6$ between their pivot points $f^7$ and the stem $f^5$ and is itself pivoted upon an arm or arms $g$ mounted on a shaft $g'$ which is supported in suitable bearings in bracket arms $g^2$ secured to the wall $a'$. An arm $g^3$ (shown in dotted lines in Figs. 1 and 3) fixed on the shaft $g'$, carries a roller $g^4$ which bears against a cam arm $h$. The latter is pivoted as at $h'$ and has suspended therefrom a weight $h^2$. By these means the high-duty valve $f$ is held to its seat against the low pressure differential, but when the pressure differential rises above the predetermined degree and the valve $f$ is opened, the roller $g^4$ acts against the underside of the cam lever $h$ to swing the same on its pivot, against the resistance of the weight $h^2$, and as the arm $g^3$ rises the cam arm is swung back to carry the weight $h^2$ toward the vertical plane of the axis of the cam arm, whereby the resistance offered by the weight to the opening of the valve is reduced and the valve offers practically no resistance to the passage of the water under it, the valve being raised meanwhile to a position above the path of straight-flow.

The low-duty valve is closed during the initial movement of the part $f^2$ of the high-duty valve and is thereafter held closed by means now to be described. To the shaft $g'$ is secured an arm $i$ and loosely mounted on the shaft, adjacent to the arm $i$, is a cam plate or quadrant $k$ which is adjustable with respect to the arm $i$ by means of an eccentric screw $i'$ carried by the quadrant $k$ and entering the slot $i^2$ in the arm $i$, so that by a slight rotation of the screw $i'$ the relative position of the arm and quadrant can be changed. The two parts may then be secured in adjusted position by a clamping screw $i^3$. The cam plate or quadrant $k$ is formed with a cam path or groove, the greater portion $k'$ of which is concentric with the shaft $g'$ while a jog or offset $k^2$ is formed at one end. This cam path is entered by a projection $l'$ on a lever $l$, close to the pivot $l^2$ thereof, so that when the quadrant $k$ starts to move from the position indicated in Fig. 1, to the position indicated in Fig. 4, the lever $l$, which may be counterbalanced as at $l^3$, is tilted quickly on its axis. The free end of the lever is connected by a link $l^4$ with an arm $m'$ on the shaft $m^2$ of the low-duty valve $m$ which is pivotally mounted in the sleeve $e$. The initial movement of the quadrant $k$ and the consequent closing of the valve $m$ are effected before the high-duty valve $f$ leaves its seat by the relative movement of the part $f^2$ of the valve, for as the pressure differential rises above the predetermined degree the excess of pressure on the diaphragm $f^3$ presses the latter toward the outlet and so moves the part $f^2$ with respect to the main part $f'$ of the valve. This movement of the part $f^2$ moves the toggle levers $f^6$ on their pivots and, through the yoke $f^8$, arm $g$, shaft $g'$ and arm $i$, imparts to the quadrant $k$ that degree of motion which is necessary to effect the movement of the valve lever $l$ to close the valve $m$ before the diaphragm $f^3$ is moved from its seat against the sleeve $d$. As the low-duty valve is closed and the entire pressure differential is exerted against the diaphragm $f^3$ the whole valve $f$ then moves away from the valve seat and into the position represented in Fig. 3. The positions which the parts assume at the initial movement of the part $f^2$ of the valve are clearly shown in Fig. 4.

It will be understood without further explanation that the entire flow, under low-duty conditions, is measured by the low-duty measuring device $a^{13}$, the high-duty valve being then closed and the low-duty valve open, and that under high-duty conditions, the high-duty valve being open and the low-duty valve closed, the high-duty flow is measured proportionally by the high-duty proportional metering device $a^{10}$, $a^{11}$ and $a^{12}$.

Other forms of metering devices than those indicated may be employed to suit different conditions of use and may be arranged as may be most convenient. The construction of the valves and of the mechanical devices by which the movement of the one is effected from the other may also be changed to suit different conditions. The invention, therefore, is not restricted to the particular construction and arrangement of parts shown and described herein.

I claim as my invention:—

1. A meter comprising a casing having an inlet and an outlet, an intermediate chamber communicating with the inlet, through an unrestricted straight-flow high-duty passage, a discharge chamber communicating with the intermediate chamber and with the outlet, a proportional-flow passage from the inlet to the intermediate chamber and a low-duty flow passage from the inlet to the discharge chamber, a valve to control the flow from the intermediate chamber to the discharge chamber, a proportional metering device in the proportional-flow passage, a metering device in the low-duty flow passage and a valve to control communication between the low-duty flow passage and the discharge chamber.

2. A meter comprising a casing having an inlet and an outlet, an intermediate chamber communicating with the inlet, a discharge chamber communicating with the intermediate chamber and with the outlet, a proportional-flow passage from the inlet to the intermediate chamber and a low-duty flow passage from the inlet to the discharge chamber, a valve to control the flow from the intermediate chamber to the discharge chamber, a proportional metering device in the proportional-flow passage, a metering device in the low-duty flow passage, and means to close the one of said valves as the other is opened.

3. A meter comprising a casing having an inlet and an outlet with a straight-flow, unrestricted, high-duty passage from the inlet to the outlet, an intermediate chamber, a discharge chamber, a high-duty proportional-flow passage from the inlet to the intermediate chamber and a low-duty flow passage from the inlet to the discharge chamber, a proportional metering device in the proportional-flow passage, a metering device in the low-duty flow passage, a valve to control communication from the intermediate chamber to the discharge chamber, and a valve to control communication from the low-duty flow passage to the discharge chamber.

4. A meter comprising a casing having an inlet and an outlet with a straight-flow, unrestricted, high-duty passage from the inlet to the outlet, an intermediate chamber, a discharge chamber, a high-duty proportional-flow passage from the inlet to the intermediate chamber and a low-duty flow passage from the inlet to the discharge chamber, a proportional metering device in the proportional-flow passage, a metering device in the low-duty flow passage, a valve to control communication from the intermediate chamber to the discharge chamber, a valve to control communication from the low-duty flow passage to the discharge chamber, and means whereby the one of said valves is closed as the other is opened.

5. A meter comprising a casing having a transverse wall which forms an inlet chamber and a discharge chamber and has a high-duty orifice in line with the inlet and the outlet and a low-duty orifice, a high-duty proportional metering device in operative relation with the high-duty orifice, a metering device in operative relation with the low-duty orifice, a valve to control the high-duty orifice, a valve to control the low-duty orifice, and means whereby the one of said valves is closed as the other is opened.

6. A meter comprising a casing having a transverse wall which forms an inlet chamber and a discharge chamber and has a high-duty orifice in line with the inlet and the outlet and a low-duty orifice, an inner casing forming an intermediate chamber about the high-duty orifice and having also an opening in line with the inlet and the outlet and a proportional-flow opening, a proportional-flow metering device operated by the flow through said proportional opening, a metering device in operative relation with the low-duty orifice, a valve to control the high-duty orifice, a valve to control the low-duty orifice, and means whereby the one of said valves is closed as the other is opened.

7. The combination with a meter casing having a transverse wall with a high-duty aperture therethrough and a low-duty aperture therethrough, of a low-duty valve, a cam arm, devices whereby the low-duty valve is moved by movement of the cam arm, a high-duty valve comprising a main part and a central part relatively movable with respect to the main part and in the same direction therewith, and a connection between the high-duty valve and the cam arm whereby the movement of the cam arm is initiated by the relative movement of the central part of the high-duty valve.

8. The combination with a meter casing having a transverse wall with a high-duty aperture therethrough and a low-duty aperture therethrough, of a low-duty valve, a cam arm, devices whereby the low-duty valve is moved by movement of the cam arm, a high-duty valve comprising a main part and a central part relatively movable with respect to the main part and in the same direction therewith, a lever mounted on the main part and connected to the central part, and a connection between the lever and the cam arm whereby the movement of the cam arm is initiated by the relative movement of the central part of the high-duty valve.

9. The combination with a meter casing having a transverse wall with a high-duty aperture therethrough and a low-duty aperture therethrough, of a low-duty valve, a cam arm, devices whereby the low-duty valve is moved by movement of the cam arm, a high-duty valve comprising a main part and a central part relatively movable with respect to the main part and in the same direction therewith, a lever mounted on the main part and connected to the central part, toggle levers mounted on the main part and connected to the central part, and a yoke connecting the toggle levers to the cam arm whereby the movement of the cam arm is initiated by the relative movement of the central part of the high-duty valve.

10. The combination with a meter casing having a transverse wall with a high-duty aperture therethrough and a low-duty aperture therethrough, of a low-duty valve, a high-duty valve, a cam plate having a cam groove with a portion concentric to the axis of the cam plate and a portion offset, a connection between the high-duty valve and the cam arm, and a lever having a projection to enter the cam groove of the cam plate and operatively connected to the low-duty valve.

11. The combination with a meter casing having a transverse wall with an aperture therethrough, of a valve to close said aperture, a shaft mounted above the valve, a depending arm secured to said shaft and connected to the valve, a second, substantially horizontal arm secured to said shaft, and a weighted lever pivoted in substantially the same horizontal plane with the shaft and bearing on the end of said second named arm.

This specification signed and witnessed this 14th day of December A. D., 1911.

JAMES M. BURTON.

Signed in the presence of—
W. B. GREELEY,
AMBROSE L. O'SHEA.